United States Patent
Stutika et al.

(10) Patent No.: US 9,340,125 B2
(45) Date of Patent: May 17, 2016

(54) EASY ENTRY ADJUSTABLE END STOP

(71) Applicant: LEAR CORPORATION, Southfield, MI (US)

(72) Inventors: Peter Stutika, Presov (SK); Peter Jenco, Presov (SK); Martin Kravcik, Presov (SK)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 14/477,991

(22) Filed: Sep. 5, 2014

(65) Prior Publication Data

US 2015/0083882 A1    Mar. 26, 2015

Related U.S. Application Data

(60) Provisional application No. 61/880,394, filed on Sep. 20, 2013.

(51) Int. Cl.
| | |
|---|---|
| *F16M 11/38* | (2006.01) |
| *B60N 2/08* | (2006.01) |
| *B60N 2/07* | (2006.01) |
| *F16M 11/04* | (2006.01) |
| *B60N 2/12* | (2006.01) |

(52) U.S. Cl.
CPC .......... *B60N 2/0856* (2013.01); *B60N 2/0722* (2013.01); *B60N 2/12* (2013.01); *F16M 11/048* (2013.01); *B60N 2002/126* (2013.01)

(58) Field of Classification Search
CPC .. B60N 2/0705; B60N 2/0715; B60N 2/0825; B60N 2/085
See application file for complete search history.

(56) References Cited

U.S. PATENT DOCUMENTS

| | | |
|---|---|---|
| 4,569,557 A | 2/1986 | Goforth |
| 4,639,038 A | 1/1987 | Heling |
| 4,852,846 A | 8/1989 | Weier |
| 4,856,847 A | 8/1989 | Kanai |
| 5,137,331 A | 8/1992 | Colozza |
| 5,522,643 A | 6/1996 | Matsuura |
| 5,527,087 A | 6/1996 | Takeda et al. |
| 5,570,931 A | 11/1996 | Kargilis et al. |
| 5,597,206 A | 1/1997 | Ainsworth et al. |
| 5,683,140 A | 11/1997 | Roth et al. |
| 5,855,413 A | 1/1999 | Couasnon et al. |
| 5,882,074 A | 3/1999 | Kojima |

(Continued)

FOREIGN PATENT DOCUMENTS

| | | |
|---|---|---|
| DE | 102009033892 A1 | 2/2011 |
| DE | 10020923 A1 | 12/2011 |
| DE | 102013214175 A1 | 11/2014 |

OTHER PUBLICATIONS

English Language Abstract of WO 2014/177351 A1 (PCT equivalent of DE 102013214175).

(Continued)

*Primary Examiner* — Amy Sterling
(74) *Attorney, Agent, or Firm* — Dykema Gossett PLLC

(57) ABSTRACT

A seat adjuster may include an end stop bracket and an adjustable end stop lever. An adjustable end stop lever may be configured to rotate between a first position in which the adjustable end stop lever engages the end stop bracket and prevents movement of a seat from a comfort range into an easy entry range, and a second position in which the adjustable end stop does not prevent movement of the seat from the comfort range into the easy entry range.

20 Claims, 5 Drawing Sheets

(56) References Cited

U.S. PATENT DOCUMENTS

| | | | |
|---|---|---|---|
| 5,899,532 A | 5/1999 | Paisley et al. | |
| 5,944,383 A | 8/1999 | Mathey et al. | |
| 6,086,154 A | 7/2000 | Mathey et al. | |
| 6,089,521 A | 7/2000 | Tarusawa et al. | |
| 6,098,946 A | 8/2000 | Sechet et al. | |
| 6,152,533 A | 11/2000 | Smuk | |
| 6,227,596 B1 * | 5/2001 | Foucault et al. | 296/65.13 |
| 6,231,123 B1 | 5/2001 | Tame | |
| 6,336,679 B1 | 1/2002 | Smuk | |
| 6,341,819 B1 | 1/2002 | Kojima et al. | |
| 6,439,531 B1 | 8/2002 | Severini et al. | |
| 6,619,741 B1 | 9/2003 | Tame | |
| 6,631,879 B2 | 10/2003 | Hibino et al. | |
| 6,666,512 B1 | 12/2003 | Timon | |
| 6,767,063 B1 | 7/2004 | Abdella et al. | |
| 6,926,364 B2 | 8/2005 | Cooley et al. | |
| 6,935,691 B1 | 8/2005 | Sasaki et al. | |
| 7,014,263 B2 | 3/2006 | Mukoujima et al. | |
| 7,025,419 B2 * | 4/2006 | Sasaki et al. | 297/344.11 |
| 7,059,679 B2 | 6/2006 | Yamada | |
| 7,090,188 B2 * | 8/2006 | Severini et al. | 248/424 |
| 7,097,250 B2 | 8/2006 | Rausch et al. | |
| 7,137,667 B2 | 11/2006 | Habedank | |
| 7,140,683 B2 * | 11/2006 | Rausch | B60N 2/123 297/341 |
| 7,152,923 B2 | 12/2006 | Charras et al. | |
| 7,172,253 B2 | 2/2007 | Haverkamp | |
| 7,434,883 B2 | 10/2008 | Deptolla | |
| 7,434,884 B2 | 10/2008 | Becker et al. | |
| 7,517,022 B2 | 4/2009 | Habedank et al. | |
| 7,562,926 B2 | 7/2009 | Kojima | |
| 7,594,634 B2 | 9/2009 | Garotte et al. | |
| 7,600,802 B2 | 10/2009 | Kojima | |
| 7,628,441 B2 | 12/2009 | Quast | |
| 7,926,875 B2 | 4/2011 | Schmale | |
| 8,205,944 B2 | 6/2012 | Watanabe | |
| 8,517,328 B2 * | 8/2013 | Wieclawski et al. | 248/429 |
| 8,585,145 B2 | 11/2013 | Nock et al. | |
| 8,777,314 B2 | 7/2014 | Nock et al. | |
| 2008/0309136 A1 | 12/2008 | Kojima et al. | |
| 2011/0012004 A1 | 1/2011 | Wieclawski et al. | |
| 2011/0012005 A1 | 1/2011 | Jahner et al. | |
| 2011/0049954 A1 | 3/2011 | Watanabe | |
| 2011/0148164 A1 | 6/2011 | Oori | |
| 2012/0119548 A1 | 5/2012 | Abraham et al. | |
| 2012/0168595 A1 | 7/2012 | Gray et al. | |
| 2012/0181833 A1 | 7/2012 | Nock et al. | |
| 2012/0187734 A1 | 7/2012 | Stoia et al. | |
| 2012/0217781 A1 | 8/2012 | Nock et al. | |
| 2012/0223561 A1 * | 9/2012 | Hurst et al. | 297/344.1 |
| 2012/0261964 A1 | 10/2012 | Yamaguchi et al. | |
| 2012/0280548 A1 | 11/2012 | Nock et al. | |

OTHER PUBLICATIONS

English Language Abstract of DE 10020923 A1.
English Language Abstract of DE 102009033892 A1.
English Language Abstract of DE 102013214175 A1.
Office Action issued in corresponding German Patent Application No. 10 2014 217 754.5 (May 11, 2015).

* cited by examiner

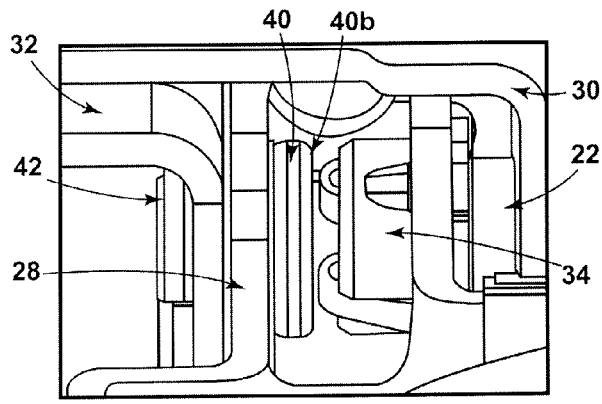
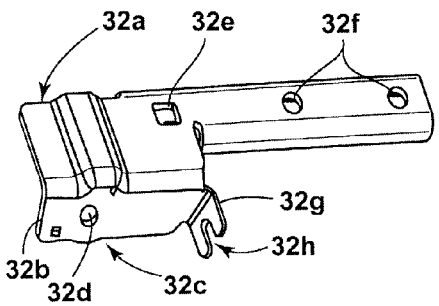
FIG. 3A  FIG. 3B
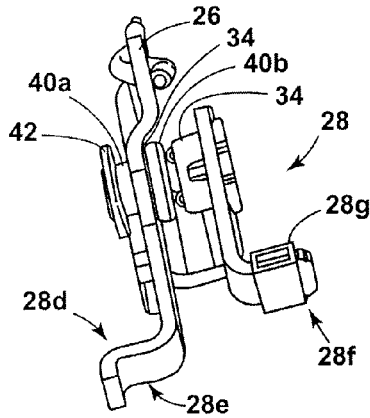
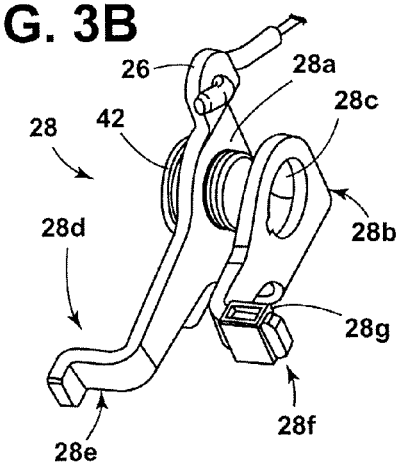
FIG. 3C  FIG. 3D
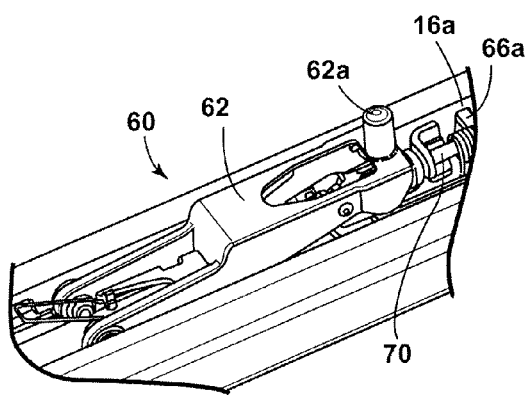
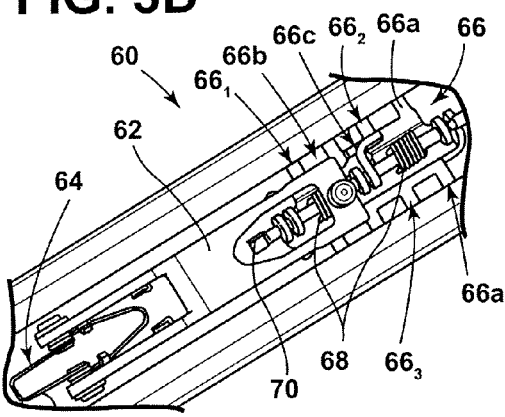
FIG. 4A  FIG. 4B

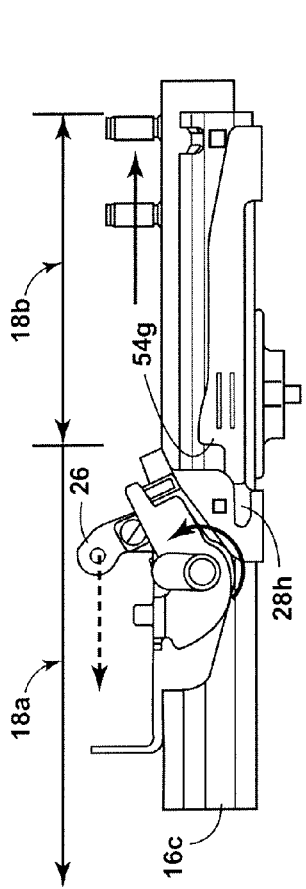
FIG. 5A
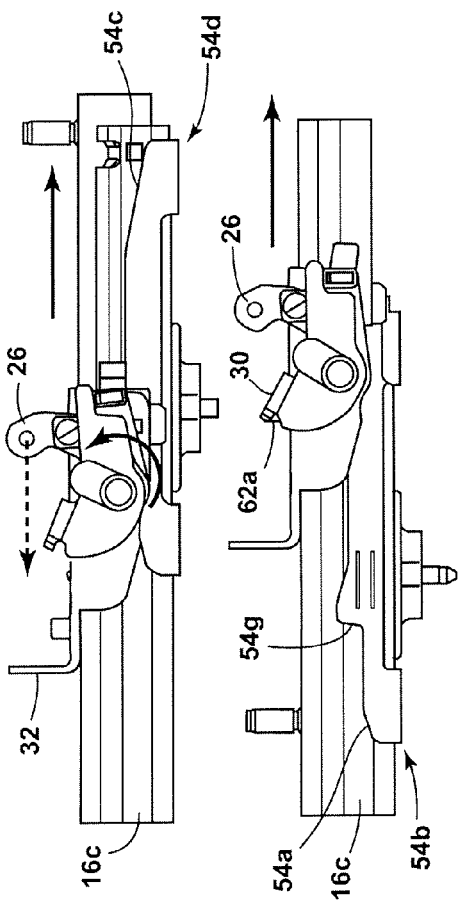
FIG. 5B
FIG. 5C
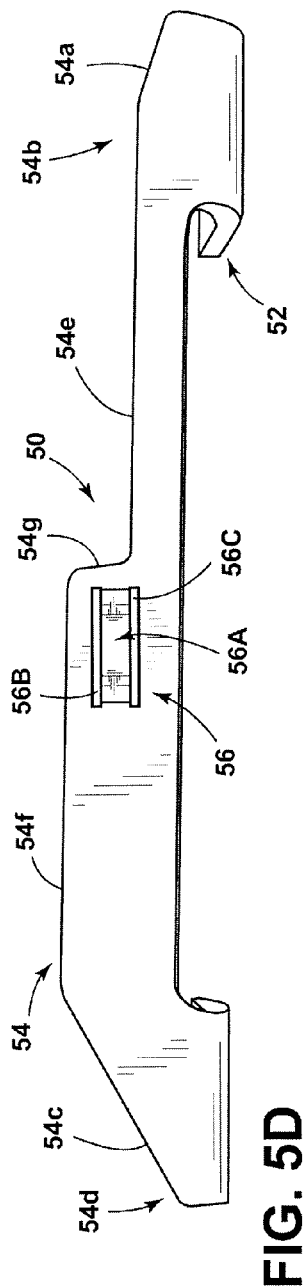
FIG. 5D

EASY ENTRY ADJUSTABLE END STOP

CROSS-REFERENCE TO RELATED APPLICATIONS

This application claims the benefit of U.S. Provisional Application Ser. No. 61/880,394, filed Sep. 20, 2013, the disclosure of which is incorporated herein by reference in its entirety.

TECHNICAL FIELD

The present disclosure generally relates to track adjusters that may be used in connection with vehicle seats.

BACKGROUND

Easy entry seat assemblies can be used in vehicles that have multiple rows of seats to provide easy entry to a rear row of seats in the vehicle. For example, a typical easy entry seat assembly may have a backrest that is pivotally supported relative to a seat bottom for movement between an upright seated position, a forward easy entry position, or a fold flat position. A typical easy entry assembly may allow the seat bottom to move forward beyond a comfort range of seating positions.

SUMMARY

An embodiment of the present disclosure includes a vehicle seat adjuster, comprising a cross member, a handle, an activation lever, an easy entry mechanism, and an adjustable end stop lever.

In an embodiment, a seat adjuster may comprise a cross member, an end stop bracket, and an adjustable end stop lever, wherein the adjustable end stop lever is configured to rotate between a first position in which the adjustable end stop lever engages the end stop bracket and prevents movement of a seat from a comfort range into an easy entry range, and a second position in which the adjustable end stop does not prevent movement of the seat from the comfort range into the easy entry range. Embodiments may comprise a base bracket including a generally horizontal portion fixed to a top of a movable track and a vertical portion extending downward from the horizontal portion, wherein an adjustable end stop lever is rotatably fixed to the vertical portion. In embodiments, an end stop bracket includes a lower section, an upper section, and an intermediate vertical section disposed between the upper and lower sections. In embodiments, an adjustable end stop lever may comprise a cross member actuator configured to engage a cross member and an adjustable end stop lever activator configured to be connected to a seat back, and the adjustable end stop lever may be formed as a single, unitary element. In embodiments, a cross member may be rotatably supported by an adjustable end stop lever.

In embodiments, an axis of rotation of a cross member may be substantially coincident with an axis of rotation of an adjustable end stop lever. In embodiments, an adjustable end stop lever may include a cross member actuator configured to rotate a cross member in at least one direction, wherein the cross member is capable of rotating independently of the adjustable end stop lever. Embodiments may comprise an activation lever fixed to rotate with a cross member and configured to selectively engage a lockset. Embodiments may comprise a connection member configured to rotate an adjustable end stop lever to cause rotation of a cross member and an activation lever, which may unlock a lockset. In embodiments, an end stop bracket may include a movement restriction portion configured to restrict movement of a movable seat track relative to a fixed seat track in at least one direction. Embodiments may comprise a movement restriction element fixed to an adjustable end stop lever and the movement restriction element may correspond to a movement restriction portion of an end stop bracket.

In embodiments, a track assembly may comprise a first pair of tracks comprising a first fixed track and a first movable track configured to slide along the first fixed track; a track adjuster including a lockset, the lockset configured to selectively lock the first fixed track and the first movable track; and an easy entry assembly comprising an easy entry lever and an end stop bracket fixed to the first fixed seat track, wherein the easy entry lever includes a first position in which the first movable track is not permitted to slide into an easy entry range, and a second position in which the first movable track is permitted to slide into the easy entry range. Embodiments may comprise a second pair of seat tracks, a biasing member, and a cross member, wherein the cross member connects first and second pairs of seat tracks, an easy entry assembly is disposed at or near the first pair of seat tracks, and the biasing member is disposed around the cross member at or near the second pair of seat tracks. In embodiments, a biasing member may be configured to bias a cross member and an easy entry assembly toward a locked position that corresponds to a lockset locking a first fixed seat track and a first movable seat track. Embodiments may comprise a comfort lever activator fixed to a cross member and configured to selectively engage a lockset, wherein axes of rotation of the comfort lever activator, an easy entry lever, and the cross member are all generally parallel to each other.

Various aspects of the present disclosure will become apparent to those skilled in the art from the following detailed description of the various embodiments, when read in light of the accompanying drawings.

BRIEF DESCRIPTION OF THE DRAWINGS

FIGS. 3A, 3B, 3C, and 3D are exploded perspective views generally illustrating portions of a vehicle seat adjuster, in accordance with embodiments of the present disclosure.

FIGS. 4A and 4B are perspective views generally illustrating portions of a vehicle seat adjuster, in accordance with embodiments of the present disclosure.

FIGS. 5A, 5B, and 5C are side views generally illustrating portions of a vehicle seat adjuster, in accordance with embodiments of the present disclosure.

FIG. 5D is a perspective view generally illustrating portions of a vehicle seat adjuster, in accordance with an embodiment of the present disclosure.

DETAILED DESCRIPTION

Figure 1A:
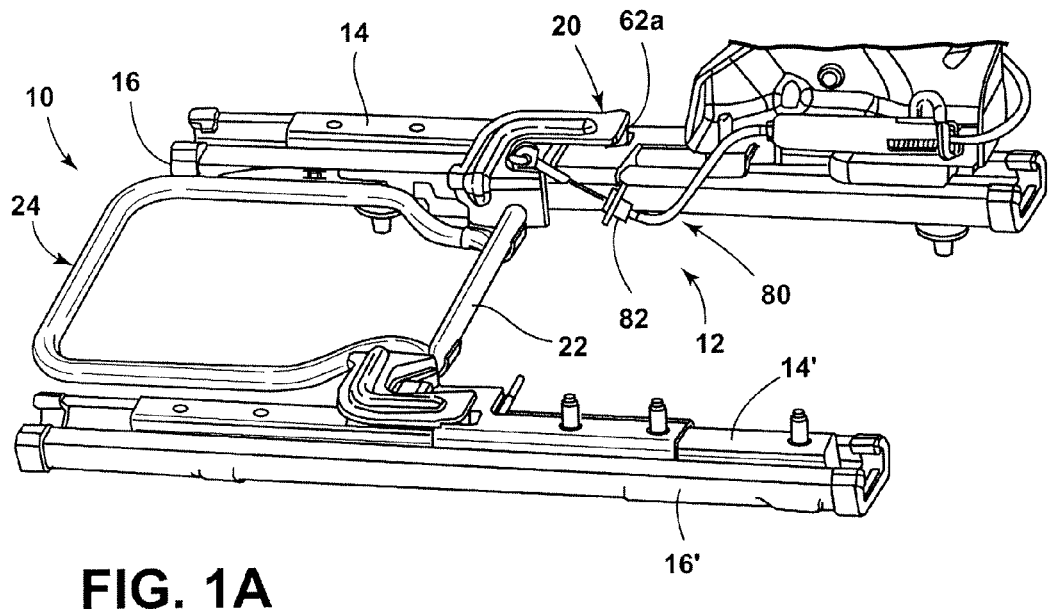
FIGS. 1A and 1B are perspective views generally illustrating portions of vehicle seat adjuster, in accordance with embodiments of the present disclosure.
Figure 1B:
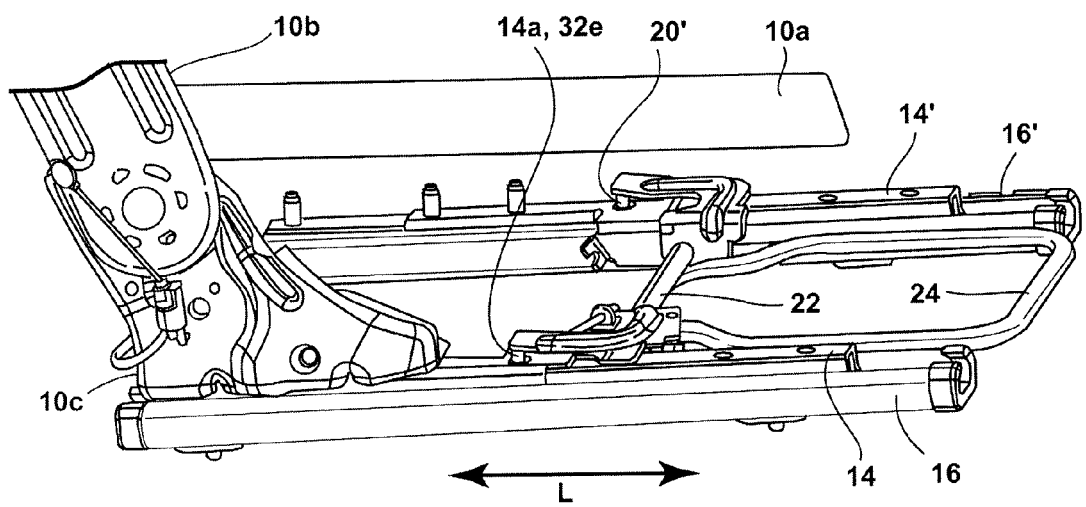

Referring now to the drawings, there is generally illustrated in FIGS. 1A and 1B a vehicle seat portion 10 including a track adjuster, indicated generally at 12, in accordance with an embodiment of the present disclosure. The illustrated vehicle seat adjuster 12 may permit vehicle seat portion 10 to be adjusted by a user in a longitudinal direction L. Vehicle seat adjuster 12 may include easy entry (EE) functionality, which may facilitate ingress and/or egress of a vehicle occupant and/or cargo. It should be appreciated, however, that vehicle seat adjuster 12 can be used in any appropriate environment and for any desired purpose, which may or may not be in connection with a vehicle and/or a seat.

In embodiments, vehicle seat adjuster 12 may include one or more first seat tracks 14, 14' and/or one or more second seat tracks 16, 16'. Second seat tracks 16, 16' may be connected and/or fixed to a base and/or floor, such as a base and/or floor of a vehicle. First tracks 14, 14' may be operatively coupled to second tracks 16, 16', respectively, to slide along second tracks 16, 16'. One or more locking devices 20, 20' may be connected to first tracks 14, 14' and/or second tracks 16, 16'. Locking device 20 may be configured to restrict relative movement between first and second tracks 14, 16 and/or locking device 20' may be configured to restrict relative movement between first and second tracks 14', 16'

As generally illustrated in FIGS. 1A-1C, 2, and 3A, in embodiments, seat adjuster 12 may include a cross member 22, a handle 24, an easy entry lever activator (EE lever activator) 26, an adjustable end stop lever (EE lever) 28, a comfort lever activator 30, an easy entry base bracket (EE base bracket) 32, an end stop bracket 50, and/or a lockset 60. In embodiments, cross member 22 may include a cross tube. EE base bracket 32 may be fixed to first track 14 and may support EE lever 28, EE lever activator 26, cross member 22, and/or comfort lever activator 30. Comfort lever activator 30 may be referred to herein a activation lever 30.

As generally illustrated in FIG. 3B, for example and without limitation, EE base bracket 32 may be generally L-shaped and may include a generally horizontal portion 32a which may be fixed to a top portion 14b of first track 14 and/or EE base bracket 32 may include a generally vertical portion 32b that may extend downwardly from a side of top portion 32b. In embodiments, EE lever 28 may be rotatably fixed to generally vertical portion 32b, which may include EE lever 28 being configured to rotate relative to vertical portion 32b and EE lever 28 not being configured to translate to a substantial degree relative to vertical portion 32b. For example, and without limitation, generally vertical portion 32b may include a connecting portion 32c, which may include an aperture 32d configured to receive a connecting member 40 and/or a bushing 34.

In embodiments, generally horizontal portion 32a may include an aperture 32e configured to receive at least a portion of a lock plate actuator 62. Generally horizontal portion 32a may, additionally or alternatively, include one or more apertures 32f that may be configured to connect seat frame 10c to EE base bracket 32. Seat frame 10c may be connected to EE base bracket 32 via one or more connecting members 10d, which may include studs. EE base bracket 32 may include an angled portion 32g, which may include a recess 32h. Angled portion 32g may be configured to be connected to a connecting member 80. For example, and without limitation, connecting member 80 may include a sheath 82 and angle portion 32g and/or recess 32h may be configured to hold sheath 82.

As generally illustrated in FIGS. 3A-3D, connecting member 40 may be configured to connect EE base bracket 32 and EE lever 28. Connecting member 40 may take a variety of forms, and may include, without limitation, a body portion 40a and/or a head portion 40b. Connecting member 40 may be generally cylindrical and/or head portion 40b may have a greater diameter than body portion 40a. For example, and without limitation, connecting member 40 may include a rivet. Connecting member 40 may be configured to be connected to a retaining member 42. Retaining member 42 may include a star lock washer that may be configured to retain connecting member 40 in EE base bracket aperture 32d.

In embodiments, EE lever 28 may be supported by EE base bracket 32 via connecting member 40. For example, and without limitation, EE lever 28 may include an aperture 28a that may be configured to receive at least a portion of connecting member 40. Bushing 34 may be arranged on connecting member 40 and/or may be arranged between EE lever 28 and connecting member 40 to facilitate rotational movement of EE lever 28 relative to EE base bracket 32.

In embodiments, EE lever 28 may be configured to rotatably support cross member 22. For example, and without limitation EE lever 28 may include a cross member connecting portion 28b. Cross member connecting portion 28b may include an aperture 28c that may be configured to receive at least a portion of cross member 22 and/or cross member 20 may be rotatably supported in aperture 28c of EE lever 28. Cross member connecting portion 28b may be connected to and/or configured to receive a bushing 34 that may be configured to receive at least a portion of cross member 22, and/or at least a portion of cross member 22 may extend into aperture 28c. Bushing 34 may be configured to facilitate relative movement between cross member 22 and EE lever 28. For example, and without limitation, bushing 34 may be arranged in cross member connecting portion 28b and a portion of cross member 22 may be inserted into bushing 34 such that cross member 22 may be able to rotate within bushing 34 and/or bushing 34 may be configured not to rotate relative to EE lever 28. In embodiments, cross member 22 may be configured to rotate independently of EE lever 28 in at least some positions of EE lever 28. For example, and without limitation, cross member may be rotated by handle 24 without rotation of EE lever, which may allow for first tracks 14, 14' to move within comfort range 18a, but may not allow first tracks 14, 14' to move into EE range 18b. In embodiments, cross member 22 and EE lever 28, which may include EE lever activator 26, cross member connecting portion 28b, EE lever protrusion 28d, and/or flexible member 28g, may be configured to rotate about axes that are parallel and/or coincident to each other.

In embodiments, EE lever 28 may include a cross member actuator 28f. Cross member actuator 28f may be configured to cause cross member 22 to rotate in at least one direction, which include cross member actuator 28f contacting comfort lever activator 30. For example, and without limitation, cross member actuator 28f may be configured to transfer rotational movement of EE lever 28 to cross member 22 via contact with comfort lever activator 30, which may be fixed to cross member 22. A flexible member 28g may be arranged between the cross member actuator 28f and the comfort lever activator 30 and may prevent actual contact and/or may absorb forces corresponding to contact between cross member actuator 28f and comfort lever activator 30.

In embodiments, EE lever 28 may be generally u-shaped, which may include EE lever activator 26 and/or EE lever protrusion on one side, and cross member connecting portion 28b, cross member actuator 28f, and/or flexible member 28g on the other side. In embodiments, portions and/or all of bushing 34 and/or connecting member 40 may be disposed between the two sides. In embodiments, EE lever 28 may be formed as a single unitary element.

As generally illustrated in FIGS. 4A and 4B, a locking device (e.g., locking device 20, and/or locking device 20') may include a lockset 60 that may be arranged between first and second tracks (e.g., tracks 14, 16 and/or track 14', 16'). For example, and without limitation, lockset 60 may be configured to selectively engage engagement portions 16a of second track 16. Lockset 60 may include a lock plate actuator 62, a lock plate actuator spring 64, one or more lock plates 66, and one or more lock plate springs 68.

In embodiments, lock plates 66 may include one or more teeth 66a and/or one or more recesses 66b. Teeth 66a may be configured to engage engagement portions 16a. Recesses 66b may be configured to receive at least a portion of engagement portions 16a.

In embodiments, lock plates 66 may be arranged in a variety of ways. For example, and without limitation, lock plates 66 may include first lock plate $66_1$, second lock plate $66_2$, and/or third lock plate $66_3$. First, second, and/or third lock plates $66_1$, $66_2$, $66_3$ may be coupled to a lock plate support 70 and each may be coupled to move and/or rotate relative to lock plate support 70. Lock plates 66 may rotate between a first position in which teeth of lock plates 66a engage engagement portions 16a, and a second position in which lock plate teeth 66a are disengaged from engagement portions 16a. If all of lock plates 66 are in the second position, relative movement between first and second tracks 14, 16 may be permitted. If one or more of lock plates 66 are at or near the first position, the one or more lock plates may be at least partially engaged with an engagement portion 16a, and relative movement between the first and second tracks 14, 16 may be restricted. Lock plates 66 may be configured to move together and/or may be configured to move independently from each other. One or more of lock plates 66 may be configured to move together in a first direction and move independently from each other in a second direction. A lock plate 66 may include an extending portion 66c that may be configured to cause at least one other lock plate 66 to move and/or rotate in at least one of the first direction and the second direction. For example, and without limitation, first lock plate $66_1$ may include an extension that may be configured to cause second lock plate $66_2$ to rotate downward when first lock plate $66_1$ rotates downward.

In embodiments, lock plate actuator 62 may be rotatably coupled to first track 14 and may be configured to rotate between a first position in which lock plate actuator 62 contacts at least one of lock plates 66 and a second position in which lock plate actuator 62 does not contact lock plates 66. Lock plate actuator spring 64 may be coupled to bias lock plate actuator 62 toward at least one of the first position and the second position. Lock plate actuator 62 may include a protrusion 62a that may be configured to extend through an aperture 14a in first track 14 and/or an aperture 32e in EE base bracket 32. Protrusion 62a may be configured to contact comfort lever activator 30. For example, and without limitation, rotation of comfort lever activator 30 may cause comfort lever activator 30 to contact protrusion 62a, which may cause lock plate actuator 62 to rotate, which may cause lock plates 66 to rotate between the first and second lock plate positions.

In embodiments, lock plate springs 68 may be configured to bias lock plates 66 toward at least one of the first and second lock plate positions. For example, and without limitation, lock plate springs 68 may be configured to bias lock plates 66 toward the first lock plate position.

In embodiments, comfort lever activator 30 may be fixed to rotate with cross member 22. Comfort lever activator 30 may be configured to contact at least a portion of lockset 60. For example, and without limitation, comfort lever activator 30 may be configured to contact protrusion 62a.

As generally illustrated in FIGS. 5A-5D, in embodiments, vehicle seat adjuster 12 may include an end stop bracket 50, which may be fixed to the second track 16. For example, and without limitation, end stop bracket 50 may include a generally L-shaped cross section, including at least one generally horizontal portion 52 that may be configured to be attached to second track 16 (e.g., bottom portion 16b of second track 16), and/or a generally vertical portion 54 that may extend generally upward from a side of generally horizontal portion 52. Generally vertical portion 54, may, additionally or alternatively, be configured to be attached to second track 16 (e.g., side portion 16c of second track 16). In embodiments, generally vertical portion 54 may be generally planar and/or may be disposed generally parallel to side portion 16c of second track.

In embodiments, end stop generally vertical portion 54 may include one or more ramped portions. For example, and without limitation, end stop bracket 50 may include a upwardly ramped portion 54a at or near a rear end 54b of end stop bracket 50 and/or a downwardly ramped portion 54c at or near front end 54d of end stop bracket 50. End stop bracket vertical portion 54 may include a lower portion 54e, an upper portion 54f, and an intermediate vertical portion 54g, which may be between lower portion 54e and upper portion 54f. In embodiments, end stop bracket 50 may be formed as single, unitary element and/or may not be configured to translate and/or rotate.

Figure 2:
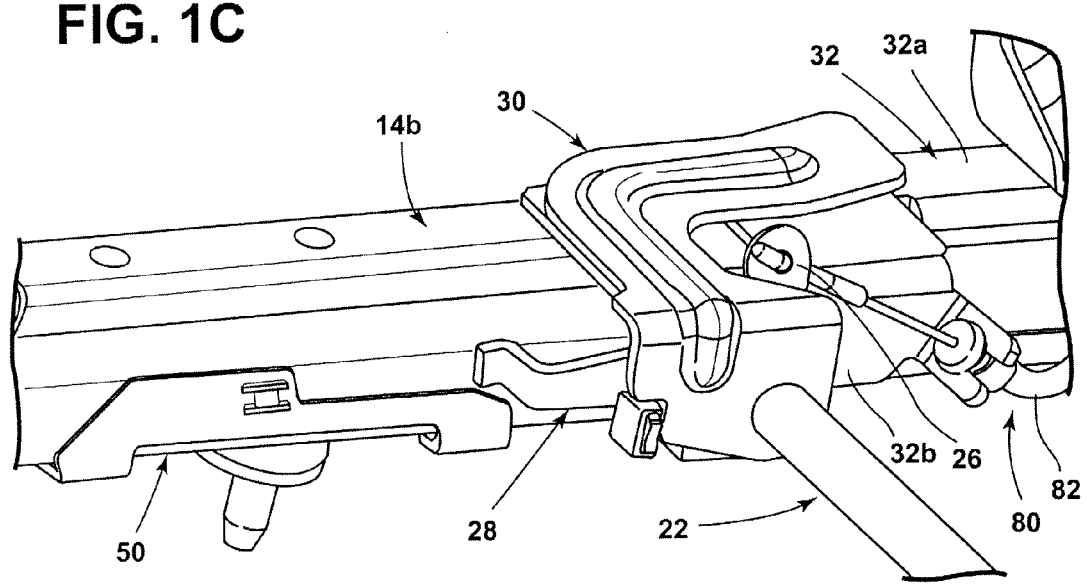
FIG. 2 is an exploded perspective view generally illustrating portions of a vehicle seat adjuster, in accordance with an embodiment of the present disclosure.

In embodiments, EE lever 28 may include a protrusion 28d that may extend generally parallel to a longitudinal direction of the first and second tracks 14, 16. EE lever protrusion 28d may be generally straight and/or may include at least one angled portion 28e. Angled portion 28e may be configured to contact end stop bracket intermediate vertical portion 54g to restrict relative movement between the first and second tracks 14, 16 in at least one position of EE lever 28. For example, and without limitation, if EE lever 28 is in a lowered position (e.g., as generally illustrated in FIG. 2) and vehicle seat portion 10 slides forward toward the front of a vehicle to the front end 54d of a comfort range, protrusion 28d may contact intermediate vertical portion 54g, preventing further forward movement of the seat portion 10. If EE lever 28 is rotated to a raised position (e.g., as generally illustrated in FIG. 5A), protrusion 28d may be raised above a height of upper portion 54f and out of contact with intermediate portion 54g, which may allow further forward movement of vehicle seat portion 10 into an easy entry range (EE range) 18b. The EE range 18b may correspond to a range of positions into which vehicle seat portion 10 may move to facilitate ingress and/or egress from a vehicle, but in which locking device 20 may not restrict relative movement between the first and second tracks 14, 16.

In embodiments, a comfort range resting position (e.g., a lowered position, as generally illustrated in FIG. 2) of the EE lever 28 may correspond to at least a portion of EE lever protrusion 28d being at or below a height of lower portion 54e of end stop bracket 50. As vehicle seat portion 10 moves forward, protrusion 28d may contact upward ramped portion 54a, which may cause EE lever 28 to rotate upward and may cause protrusion 28d to rise above a height of lower portion 54e.

Figure 7:
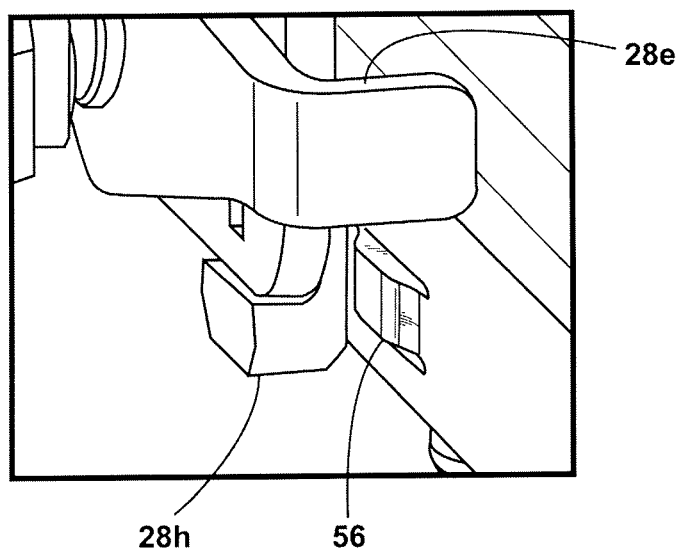
FIG. 7 is a perspective view generally illustrating portions of a vehicle seat adjuster, in accordance with an embodiment of the present disclosure.

As generally illustrated in FIGS. 5D and 7, in embodiments, end stop bracket 50 may include a movement restricting portion 56. For example, and without limitation, movement restricting portion 56 may extend outwardly from a side of generally vertical portion 54 of end stop bracket 50. Movement restricting portion 56 may slow sliding movement of a vehicle seat portion 10 in at least one direction, such as, without limitation, when the vehicle seat portion 10 slides rearward from the EE range 18b toward the comfort range 18a. Such slowing of the sliding movement of the vehicle seat portion 10 may help cause the vehicle seat portion 10 to lock at the frontmost comfort range position as the vehicle seat portion 10 returns from the EE range 18b. For example, and without limitation, the slowed movement of the seat portion 10 may help cause the seatback 10b to return to a generally vertical seating position as the seat portion 10 approaches the comfort range, which may rotate the locking lever downward, allowing the locking device 20 to restrict relative movement between the first and second tracks 14, 16. EE lever 28 and/or generally vertical portion 32b of EE base bracket 32 may include a movement restricting portion 28h that may cooperate with movement restricting portion 56. Movement restriction element 28h may include a flexible, such as, for example, rubber. Movement restriction element 28h may be configured to come into contact a raised portion 56a of movement restriction portion. Raised portion 56a may be disposed adjacent to and/or between aperture 56b and/or aperture 56c.

Figure 1C:
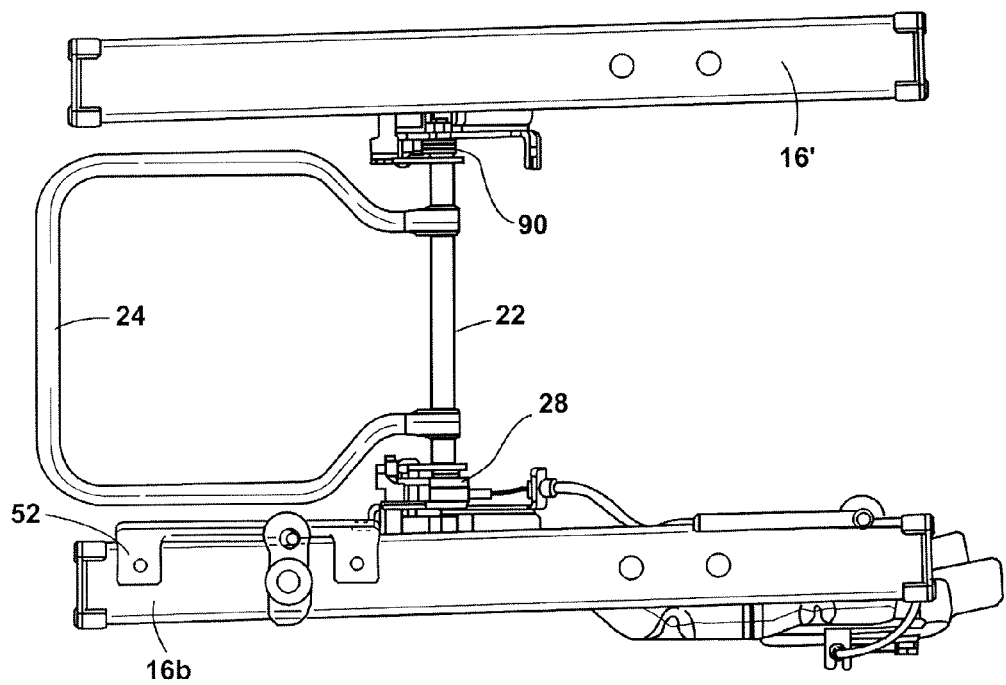
FIG. 1C is a bottom view generally illustrating portions of a vehicle seat adjuster, in accordance with embodiments of the present disclosure.

In embodiments, seat adjuster 12 may include a biasing member 90 that may be configured to bias cross member 22, handle 24, EE lever 28, and/or comfort lever activator 30 in a forward direction, which may correspond to lock plates 66 being in the first position, which may restrict movement of the seat. Biasing member 90 may be arranged around cross member 22. As generally illustrated in FIG. 1C, biasing member 90 may be arranged at a distance from EE lever 28 and/or may not contact any portion of EE lever 28 and/or comfort lever activator 30. For example, and without limitation, EE lever 28 and comfort lever activator 30 may be disposed at or near a first pair of tracks (e.g., 14, 16) and/or biasing member 90 may be disposed at or near a second pair of tracks (e.g., 14', 16'). Biasing member 90 may include more than one biasing member. In embodiments, biasing member 90 may be the only biasing member included in seat adjuster 12.

In embodiments, an occupant may be able to actuate handle 24 to slide vehicle seat portion 10 between the frontmost and rearmost positions in the comfort range. For example, an occupant may lift upward on handle 24, which may overcome the force of biasing member 90, causing cross member 22 to rotate, which may cause comfort lever activator 30 to rotate toward the tracks and engage the lockset 60, which may allow seat portion 10 to slide. If the occupant slides seat portion 10 to the frontmost position in the comfort range, a front portion of the EE lever 28 (e.g., angled portion 28e) may contact end stop bracket 50, which may prevent further forward sliding of the seat portion 10.

As generally illustrated in FIGS. 5A, 5B, and 5C, an occupant may actuate the comfort lever activator 30 via the EE lever activator 26, which may permit sliding of first tracks 14, 14' beyond comfort range 18a and/or into EE range 18b. Movement of the seatback 10b may cause actuation of EE lever 28. For example, and without limitation, an occupant may cause movement of the EE lever activator 26 via movement of the seatback 10b, such that rotation of the seatback 10b causes a connection member 80 to rotate EE lever activator 26. Connection member 80 may include one or more of a cable, rod, and/or lever linkage. Rotation of EE lever activator 26 may cause EE lever 28 to rotate, which may lift angled portion 28e out of engagement with and/or above end stop bracket top portion 54f, which may cause comfort lever activator 30 to contact the lockset 60 (e.g., at protrusion 62a) and/or may allow first tracks 14, 14' to slide farther forward into EE range 18b.

Figure 6A:
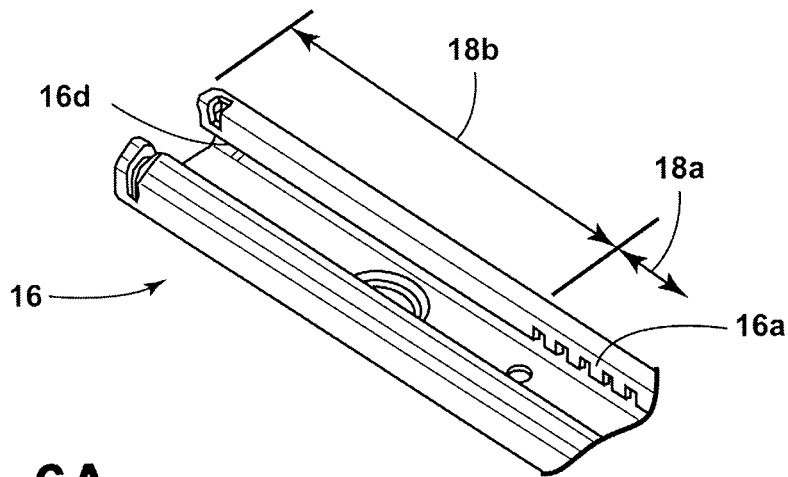
FIGS. 6A and 6B are perspective views generally illustrating portions of a vehicle seat adjuster, in accordance with embodiments of the present disclosure.
Figure 6B:
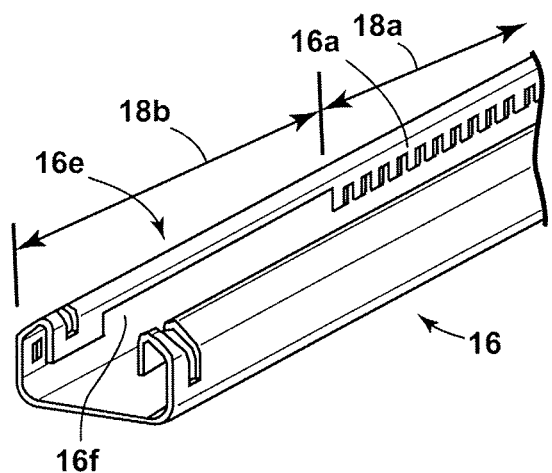

As generally illustrated in FIGS. 6A and 6B, second tracks 16, 16' may include one or more engagement portions 16a. In embodiments, second tracks 16, 16' may include portions that do not include engagement portions, which may correspond to EE range 18b. For example, portion 16d may not include engagement portions. Portion 16d may allow seat portion 10 to move within EE range 18b even if EE lever activator 26 is no longer being actuated (e.g., even if seatback 10b is returned to a generally upright position). Portion 16d may be configured such that lock plates 66 may be in contact with second track 16 (e.g., slide along the lower edge) when seat 10 is in the easy entry range 18b.

As generally illustrated in FIG. 6B, second tracks 16, 16' may include a portion 16e that may not include engagement portions, but may include an elongated recess 16f. Portion 16e and/or elongated recess 16f may be configured such that lock plates 66 may not be in contact with second track 16 when seat 10 is in the easy entry range 18b.

It should be understood that references to a single element are not so limited and may include one or more of such element. It should also be understood that references to a spring are not limited to a particular type of spring and may include, without limitation, any type of biasing member and/or material. Also, references to an occupant are not limited to a person in a vehicle or to a person sitting in a vehicle seat portion 10, and may include, without limitation, anything interacting with vehicle seat portion 10. It should be understood that although embodiments may be disclosed in connection with a vehicle seat, a track adjuster may be applied to a variety of applications.

It should be understood that the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present teachings not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A seat adjuster, comprising:
   a cross member;
   an end stop bracket; and
   an adjustable end stop lever;
   wherein the adjustable end stop lever is configured to rotate between a first position in which the adjustable end stop lever engages the end stop bracket and prevents movement of a seat from a comfort range into an easy entry range, and a second position in which the adjustable end stop does not prevent movement of the seat from the comfort range into the easy entry range;
   wherein the cross member is rotatably supported by the adjustable end stop lever and the cross member is configured for rotating independently of the adjustable end stop lever.

2. The seat adjuster of claim 1, comprising a base bracket including a generally horizontal portion fixed to a top of a movable track and a vertical portion extending downward from the horizontal portion, wherein the adjustable end stop lever is rotatably fixed to the vertical portion.

3. The seat adjuster of claim 1, wherein the end stop bracket includes a lower section, an upper section, and an intermediate vertical section disposed between the upper section and the lower section.

4. The seat adjuster of claim 1, wherein the adjustable end stop lever comprises a cross member actuator configured to rotate the cross member and an adjustable end stop lever activator configured for connection to a seat back, and wherein the adjustable end stop lever is formed as a single, unitary element.

5. The seat adjuster of claim 1, wherein an axis of rotation of the cross member is substantially coincident with an axis of rotation of the adjustable end stop lever.

6. The seat adjuster of claim 1, wherein the adjustable end stop lever includes a cross member actuator configured to rotate the cross member in at least one direction.

7. The seat adjuster of claim 1, comprising an activation lever fixed to rotate with the cross member, the activation lever configured to selectively engage a lockset.

8. The seat adjuster of claim 7, comprising a connection member configured to rotate the adjustable end stop lever to cause rotation of the cross member and the activation lever to unlock the lockset.

9. The seat adjuster of claim 1, wherein the end stop bracket includes a movement restriction portion configured to restrict movement of a movable seat track relative to a fixed seat track in at least one direction.

10. The seat adjuster of claim 9, comprising a movement restriction element fixed to the adjustable end stop lever, the movement restriction element corresponding to the movement restriction portion of the end stop bracket.

11. The seat adjuster of claim 9, wherein the movement restriction portion includes a raised portion that extends laterally outward from movement restriction portion.

12. A seat adjuster, comprising:
an adjustable end stop lever;
a cross member rotatably supported by the adjustable end stop lever;
an end stop bracket; and
wherein the adjustable end stop lever is configured to rotate between a first position in which the adjustable end stop lever engages the end stop bracket and prevents movement of a seat from a comfort range into an easy entry range, and a second position in which the adjustable end stop lever does not prevent movement of the seat from the comfort range into the easy entry range;
wherein the end stop bracket includes a movement restriction portion configured to restrict movement of a movable seat track relative to a fixed seat track in at least one direction, and the movement restriction portion includes a raised portion that extends laterally outward from movement restriction portion;
wherein the end stop bracket includes a first aperture and a second aperture, and the raised portion disposed at least partially between the first aperture and the second aperture.

13. The seat adjuster of claim 9, comprising a base bracket configured to rotatably support the adjustable end stop lever, and a movement restriction element fixed to the base bracket, wherein the movement restriction element is configured to engage the movement restriction portion of the end stop bracket.

14. The seat adjuster of claim 13, wherein the movement restriction element comprises a flexible material.

15. The seat adjuster of claim 14, wherein the flexible material includes rubber.

16. A seat adjuster, comprising:
an end stop bracket including a movement restriction portion configured to restrict movement of a movable seat track relative to a fixed seat track in at least one direction;
an adjustable end stop lever;
a cross member rotatably supported by the adjustable end stop lever;
a base bracket configured to rotatably support the adjustable end stop lever, and
a movement restriction element fixed to the base bracket,
wherein the movement restriction element comprises a flexible material and is configured to engage the movement restriction portion of the end stop bracket;
wherein the adjustable end stop lever is configured to rotate between a first position in which the adjustable end stop lever engages the end stop bracket and prevents movement of a seat from a comfort range into an easy entry range, and a second position in which the adjustable end stop lever does not prevent movement of the seat from the comfort range into the easy entry range.

17. The seat adjuster of claim 1, comprising;
a first pair of tracks including a first fixed track and a first movable track configured to slide along the first fixed track, the first movable track connected to said seat;
a lockset, the lockset configured to selectively lock the first fixed track and the first movable track; and
an easy entry assembly including the adjustable end stop lever and the end stop bracket,
wherein the end stop bracket is fixed to the first fixed track.

18. The track assembly of claim 17, comprising a second pair of seat tracks, and a biasing member, wherein the cross member connects the first and second pairs of seat tracks, the easy entry assembly is disposed at or near the first pair of seat tracks, and the biasing member is disposed around the cross member at or near the second pair of seat tracks.

19. The track assembly of claim 18, wherein biasing member is configured to bias the cross member and the easy entry assembly toward a locked position that corresponds to the lockset locking the first fixed seat track and the first movable track.

20. The track assembly of claim 17, comprising a comfort lever activator fixed to the cross member and configured to selectively engage the lockset, wherein axes of rotation of the comfort lever activator, the adjustable end stop lever, and the cross member are all generally parallel to each other.

* * * * *